(12) United States Patent
Ross et al.

(10) Patent No.: US 10,902,540 B2
(45) Date of Patent: Jan. 26, 2021

(54) EVENT-DRIVEN AUTHENTICATION OF PHYSICAL OBJECTS

(71) Applicant: Alitheon, Inc., Redmond, WA (US)

(72) Inventors: David Justin Ross, Redmond, WA (US); Justin Lynn Withrow, Redmond, WA (US); Scot E. Land, Redmond, WA (US)

(73) Assignee: ALITHEON, INC., Bellevue, WA (US)

( * ) Notice: Subject to any disclaimer, the term of this patent is extended or adjusted under 35 U.S.C. 154(b) by 99 days.

(21) Appl. No.: 15/672,182

(22) Filed: Aug. 8, 2017

(65) Prior Publication Data

US 2018/0047128 A1 Feb. 15, 2018

Related U.S. Application Data

(60) Provisional application No. 62/374,162, filed on Aug. 12, 2016.

(51) Int. Cl.
*G06K 9/00* (2006.01)
*G06T 1/00* (2006.01)
(Continued)

(52) U.S. Cl.
CPC .......... *G06T 1/0028* (2013.01); *G06F 16/434* (2019.01); *G06K 9/00201* (2013.01);
(Continued)

(58) Field of Classification Search
CPC . G06T 1/0028; G06T 1/60; G06T 1/20; G06F 16/434; G06K 9/6215; G06K 9/00201
(Continued)

(56) References Cited

U.S. PATENT DOCUMENTS 4,218,674 A 8/1980 Broscow et al.
4,423,415 A 12/1983 Goldman
(Continued)

FOREIGN PATENT DOCUMENTS

DE 102006005927 A1 8/2007
EP 0439669 A2 8/1991
(Continued)

OTHER PUBLICATIONS

Kartik, J. Shankar, K. Ram Kumar, and V. S. Srimadhavan. "Security system with face recognition, SMS alert and embedded network video monitoring terminal." International Journal of Security, Privacy and Trust Management (IJSPTM) vol. 2 (Year: 2013).*
(Continued)

*Primary Examiner* — Andrew M Moyer
(74) *Attorney, Agent, or Firm* — DLA Piper LLP (US)

(57) ABSTRACT

A system may include an event trigger processor (ETP) configured to receive signals from sensors or another system (FIG. 11). Output signals from the sensor(s), local or remotely located, may be utilized by the ETP as trigger inputs to initiate a process or response, namely authentication actions, which also may be local or remote from the ETP. Events from external systems also may serve as trigger inputs to the ETP. In some embodiments, as a triggered response, the ETP may direct a local field imaging system to acquire an image of an object, generate a digital fingerprint from the image, and query a database using the generated digital fingerprint to identify or authenticate the object. The ETP may initiate or direct various actions by sending a message to another entity or system, for example, using known network communication protocols.

26 Claims, 12 Drawing Sheets

(51) Int. Cl.
*G06F 16/432* (2019.01)
*G06K 9/62* (2006.01)
*G06T 1/20* (2006.01)
*G06T 1/60* (2006.01)

(52) U.S. Cl.
CPC .............. *G06K 9/6215* (2013.01); *G06T 1/20* (2013.01); *G06T 1/60* (2013.01)

(58) Field of Classification Search
USPC ........................................................ 382/100
See application file for complete search history.

(56) References Cited

U.S. PATENT DOCUMENTS

| | | | |
|---|---|---|---|
| 4,677,435 A | 6/1987 | Causse D'Agraives et al. |
| 4,700,400 A | 10/1987 | Ross |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1 | 3/2010 | Ross et al. |
| 7,680,306 B2 | 3/2010 | Boutant |
| 7,720,256 B2 | 5/2010 | Desprez et al. |
| 7,726,457 B2 | 6/2010 | Maier et al. |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 8,774,455 B2 | 7/2014 | Elmenhurst et al. |
| 9,031,329 B1 | 5/2015 | Farid et al. |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,540,664 B2 | 1/2020 | Ross et al. |
| 10,572,883 B2 | 2/2020 | Ross et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2005/0007776 A1* | 1/2005 | Monk .................. G03H 1/2286 362/239 |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De Leo et al. |
| 2005/0137882 A1 | 6/2005 | Cameron et al. |
| 2005/0160271 A9* | 7/2005 | Brundage ............. G06T 1/0071 713/176 |
| 2005/0169529 A1 | 8/2005 | Owechko et al. |

(56) References Cited

U.S. PATENT DOCUMENTS

| | | |
|---|---|---|
| 2005/0188213 A1 | 8/2005 | Xu |
| 2005/0204144 A1* | 9/2005 | Mizutani .............. G06F 3/1222 |
| | | 713/182 |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1* | 5/2006 | Gossaye ............ H04N 1/00681 |
| | | 358/449 |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1* | 5/2009 | Ikeda .................... G06K 7/084 |
| | | 235/440 |
| 2009/0154778 A1 | 6/2009 | Lei et al. |
| 2009/0157733 A1 | 6/2009 | Kim et al. |
| 2009/0223099 A1* | 9/2009 | Versteeg ................ G06Q 99/00 |
| | | 40/6 |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1* | 9/2012 | Di Venuto Dayer ....................... |
| | | G06K 9/3208 |
| | | 382/218 |
| 2012/0250945 A1 | 10/2012 | Peng et al. |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0201094 A1* | 7/2014 | Herrington .......... G06Q 30/018 |
| | | 705/317 |
| 2014/0184843 A1 | 9/2014 | Campbell et al. |
| 2014/0314283 A1 | 10/2014 | Harding |
| 2014/0380446 A1* | 12/2014 | Niu ..................... G06F 21/6245 |
| | | 726/7 |
| 2015/0058142 A1 | 2/2015 | Lenahan et al. |
| 2015/0078629 A1 | 3/2015 | Gottemukkula et al. |
| 2015/0086068 A1 | 3/2015 | Mulhearn et al. |
| 2015/0117701 A1* | 4/2015 | Ross .................... G06K 9/3216 |
| | | 382/100 |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0180546 A1 | 6/2016 | Kim et al. |
| 2016/0189510 A1 | 6/2016 | Hutz |
| 2017/0004444 A1 | 1/2017 | Krasko et al. |
| 2017/0032285 A1 | 2/2017 | Sharma et al. |
| 2017/0132458 A1* | 5/2017 | Short ................. G06K 9/00288 |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1* | 1/2018 | Fankhauser ........ G07C 9/00087 |
| 2018/0024074 A1 | 1/2018 | Ranieri et al. |
| 2018/0024178 A1 | 1/2018 | House et al. |
| 2018/0053312 A1 | 2/2018 | Ross et al. |
| 2018/0121643 A1* | 5/2018 | Talwerdi ................. G06F 21/32 |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |
| 2020/0334689 A1 | 10/2020 | Ross et al. |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0759596 A2 | 2/1997 |
| EP | 1016548 A2 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2 869 240 A2 | 5/2015 |
| EP | 2257909 B1 | 5/2015 |
| EP | 2869241 A2 | 5/2015 |
| EP | 3208744 A1 | 8/2017 |
| EP | 3249581 A1 | 11/2017 |
| EP | 3435287 A2 | 1/2019 |
| GB | 2097979 A | 11/1982 |
| GB | 2482127 | 1/2012 |

(56) References Cited

FOREIGN PATENT DOCUMENTS

| | | |
|---|---|---|
| JP | S61234481 A | 10/1986 |
| JP | H07192112 A | 7/1995 |
| JP | 2007213148 A | 8/2007 |
| KR | 20120009654 A | 2/2012 |
| WO | WO2005086616 A2 | 9/2005 |
| WO | WO2006038114 A1 | 4/2006 |
| WO | WO2007028799 A1 | 3/2007 |
| WO | WO2007031176 A1 | 3/2007 |
| WO | WO2007071788 A1 | 6/2007 |
| WO | WO2007090437 A1 | 8/2007 |
| WO | WO2007144598 A1 | 12/2007 |
| WO | WO2009030853 A1 | 3/2009 |
| WO | WO2009089126 A1 | 7/2009 |
| WO | WO2009115611 A2 | 9/2009 |
| WO | WO2010018464 A2 | 2/2010 |
| WO | WO2012145842 A1 | 11/2012 |
| WO | WO2013126221 A1 | 8/2013 |
| WO | WO2013173408 A1 | 11/2013 |
| WO | WO2015004434 A1 | 1/2015 |
| WO | WO2016081831 A1 | 5/2016 |

OTHER PUBLICATIONS

Di Paola et al., "An Autonomous Mobile Robotic System for Surveillance of Indoor Environments," *International Journal of Advanced Robotic Systems* 7(1):19-26, 2010.
Extended European Search Report, dated Dec. 7, 2017, for European Application No. 17185801.2-1901, 10 pages.
Kartik et al., "Security System with Face Recognition, SMS Alert and Embedded Network Video Monitoring Terminal," *International Journal of Security, Privacy and Trust Management* 2(5):9-19, 2013.
Veena et al., "Automatic Theft Security System (Smart Surveillance Camera)," *Computer Science & Information Technology* 3:75-87, 2013.
U.S. Appl. No. 13/410,753, filed Mar. 2, 2012, Document Fingerprinting.
U.S. Appl. No. 14/290,653, filed May 29, 2014, Document Fingerprinting.
U.S. Appl. No. 14/531,307, filed Nov. 3, 2017, Digital Fingerprinting Track and Trace System.
U.S. Appl. No. 14/531,724, filed Nov. 3, 2014, Digital Fingerprinting Object Authentication and Anti-Counterfeiting System.
U.S. Appl. No. 15/862,556, filed Jan. 4, 2018, Database for Detecting Counterfeit Items Using Digital Fingerprint Records.
U.S. Appl. No. 15/044,034, filed Feb. 15, 2016, Document Authentication Using Extracted Digital Fingerprints.
U.S. Appl. No. 15/208,339, filed Jul. 12, 2016, Database for Detecting Counterfeit Items Using Digital Fingerprint Records.
U.S. Appl. No. 16/041,710, filed Jul. 20, 2018, Authentication of a Suspect Object Using Extracted Native Features.
U.S. Appl. No. 13/618,362, filed Sep. 12, 2012, Object Identification and Inventory Management.
U.S. Appl. No. 14/841,359, filed Aug. 31, 2015, Object Identification and Inventory Management.
U.S. Appl. No. 15/436,616, filed Feb. 17, 2017, Preserving Authentication Under Item Change.
U.S. Appl. No. 15/436,631, filed Feb. 17, 2017, Personal History in Track and Trace System.
U.S. Appl. No. 16/029,515, filed Jul. 6, 2018, Personal History in Track and Trace System.
U.S. Appl. No. 15/436,646, filed Feb. 17, 2017, Preserving a Level of Confidence of Authenticity of an Object.
U.S. Appl. No. 15/436,656, filed Feb. 17, 2017, Multi-Level Authentication.
U.S. Appl. No. 15/490,774, filed Apr. 18, 2017, Authentication-Triggered Processes.
U.S. Appl. No. 15/600,566, filed May 19, 2017, Controlled Authentication of Physical Objects.
U.S. Appl. No. 15/635,040, filed Jun. 27, 2017, Centralized Databases Storing Digital Fingerprints of Objects for Collaborative Authentication.
U.S. Appl. No. 15/641,157, filed Jul. 3, 2017, Authenticated Production.
U.S. Appl. No. 15/649,567, filed Jul. 13, 2017, Database Records and Processes to Identify and Track Physical Objects During Transportation.
U.S. Appl. No. 15/680,137, filed Aug. 17, 2017, Authentication-Based Tracking.
U.S. Appl. No. 16/045,642, filed Jul. 25, 2018, Model-Based Digital Fingerprinting.
Farid, "Digital Image Forensics," Dartmouth CS 89/189, Sprint 2013, 199 pages.
Huang et al., "A Novel Binarization Algorithm for Ballistic Imaging Systems," 3rd International Congress on Image and Signal Processing, Yantai, China, Oct. 16-18, 2010, pp. 1287-1291.
Huang et al., "An Online Ballistics Imaging System for Firearm Identification," 2nd International Conference on Signal Processing Systems, Dalian, China, Jul. 5-7, 2010, vol. 2, pp. 68-72.
Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.
Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 2 pages.
Smith, "Fireball: A Forensic Ballistic Imaging System: Proceedings of the 31st Annual International Carnahan Conference on Security Technology," Canberra, Australia, Oct. 15-17, 1997, pp. 64-70.
United States Postal Service, "NCOALink ® Systems," URL=https://web.archive.org/web/20100724142456/http://www.usps.com/ncsc/addressservices/moveupdate/changeaddress.htm, download date Jun. 23, 2010, 2 pages.
United States Postal Service Publication 28 "Postal Addressing Standards", dated Jul. 2008; text plus Appendix A only; 55 pages.
Boa et al., "Local Feature based Multiple Object Instance Identification using Scale and Rotation Invariant Implicit Shape Model," 12th Asian Conference on Computer Vision, Singapore, Nov. 1-5, 2014, pp. 600-614.
Beekhof et al., "Secure Surface Identification Codes," Proceeding of the SPIE 6819: Security Forensics, Steganography, and Watermarking of Multimedia Contents X:68190D, 2008. (12 pages).
Buchanan et al., "Fingerprinting documents and packaging," Nature 436 (7050): 475, 2005.
Fischler et al., "Random Sample Consensus: A Paradigm for Model Fitting with Applications to Image Analysis and Automated Cartography," Communication of the ACM 24(6); 381-395, 1981.
Li, "Image Processing for the Positive Identification of Forensic Ballistics Specimens," Proceedings of the 6th International Conference of Information Fusion, Cairns, Australia, Jul. 8-11, 2003, pp. 1494-1498.
Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.
Matsumoto et al., "Nano-artifact metrics based on random collapse of resist," Scientific Reports 4:6142, 2014 (5 pages).
Rublee et al., "ORB: an efficient alternative to SIFT or SURF," IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Shi et al., "Smart Cameras: Fundamentals and Classification," Chapter 2, Belbachir (ed.), Smart Cameras, Springer, New York, New York, USA 2010, pp. 19-34.

(56) References Cited

OTHER PUBLICATIONS

Takahashi et al., Mass-produced Parts Traceability System Based on Automated Scanning of "Fingerprint of Things," 15th IAPR International Conference on Machine Vision Applications, Nagoya, Japan, May 8-12, 2017, 5 pages.

United States Postal Services, NCOALink® Systems, dated May 27, 2009, URL=http://ribbs.usps.gov/ncoalink/ncoalink_print.htm, download date Jun. 23, 2010, 3 pages.

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).

Shields, "How to Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages.

Entrupy.com Website History, Wayback Machine; https://web.archive.org/web/20160330060808/https://www.entrupy.com/; Mar. 30, 2016 (Year: 2016), 2 pages.

Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.

Mistry et al., "Comparison of Feature Detection and Matching Approaches: SIFT and SURF," Global Research and Development Journal for Engineering, vol. 2, Issue 4, Mar. 2017, 8 pages.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Cavoukian et al.; "Biometric Encryption: Technology for Strong Authentication, Security and Privacy, Office of the information and Privacy Commissioner, Toronto, Ontario, Canada," 2008, in WE, International Federation Iot Information Processing, vol. 261; Policies and Research in Identity Management; Eds. E. de Leeuw. Fischer-Hiibner, S. Tseng, J., Barking, J.: (Boston: Springer), pp. 57-77 (21 pages).

* cited by examiner

FIG. 7A
FIG. 7B
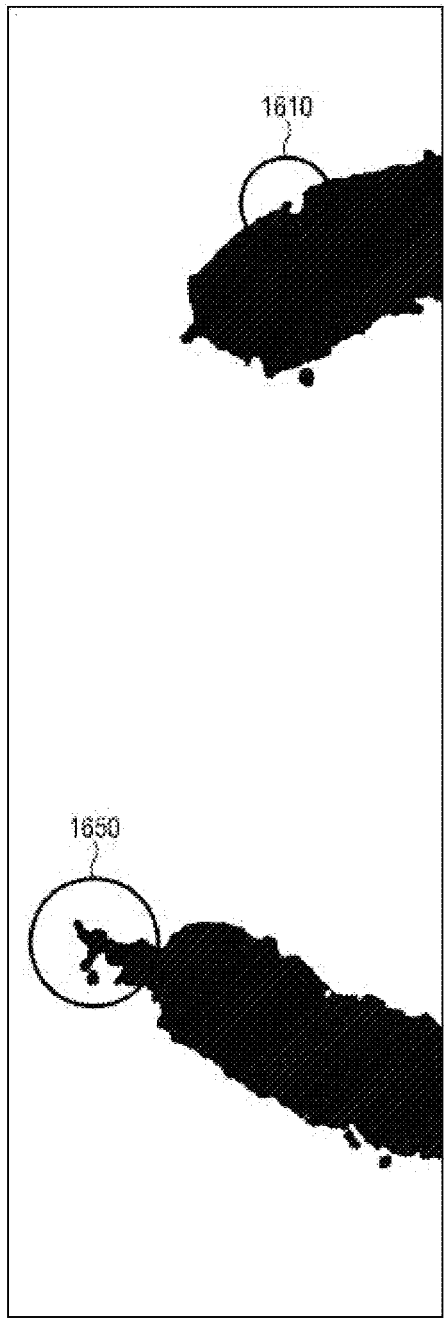
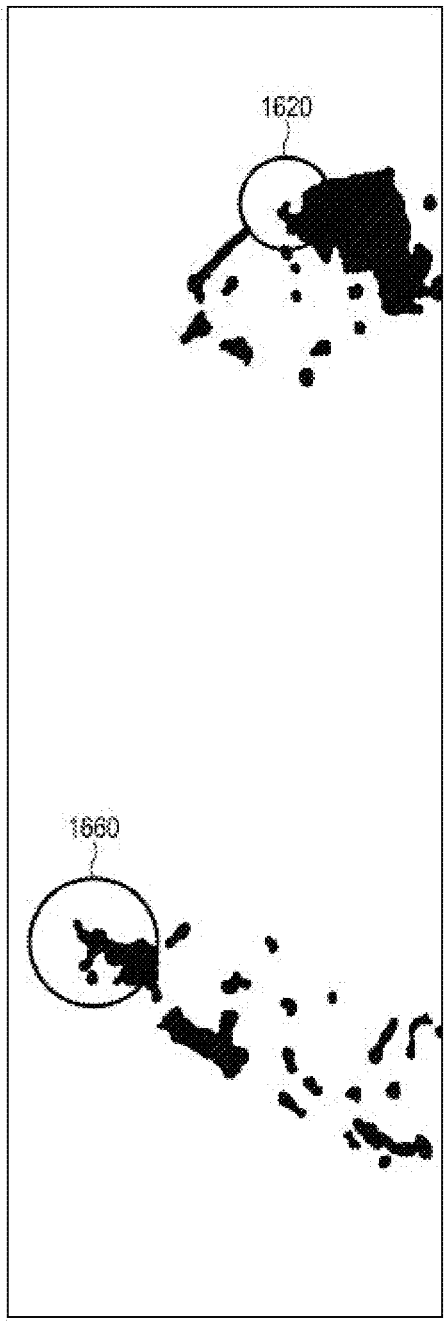

EVENT-DRIVEN AUTHENTICATION OF PHYSICAL OBJECTS

PRIORITY CLAIM

This application is a non-provisional of, and claims priority pursuant to 35 U.S.C. § 119(e) (2012) to U.S. provisional application No. 62/374,162 filed Aug. 12, 2016, hereby incorporated by reference as through fully set forth.

COPYRIGHT NOTICE

COPYRIGHT© 2016-2017 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d) (2017).

TECHNICAL FIELD

Centralized databases storing digital fingerprints of objects enabling enhanced security, rapid searching, and high reliability. Methods and apparatus to identify, track, and authenticate any physical object utilizing a suitable database. In particular, event-triggered authentication of objects utilizing digital fingerprints.

BACKGROUND

Many different approaches are known to uniquely identify and authenticate physical objects, including labeling and tagging strategies using serial numbers, barcodes, holographic labels, RFID tags, and hidden patterns using security inks or special fibers. All currently known methods rely on applied identifiers that are extrinsic to the object and, as such, may fail to detect introduction of counterfeit or otherwise unknown objects. In addition, many applied identifiers add substantial costs to the production and handling of the objects sought to be identified or authenticated. Applied identifiers, such as labels and tags, are also at themselves at risk of being damaged, lost, stolen, duplicated, or otherwise counterfeited.

SUMMARY OF THE PRESENT DISCLOSURE

The following is a summary of the present disclosure in order to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

There are many known approaches to establishing or reestablishing the authenticity of an object, including secure supply chains, expert assessment, and counterfeit detection. What is lacking, however, and is provided by the current disclosure, is the ability to perform event-triggered authentication utilizing digital fingerprints and fingerprint templates for both overt and covert authentication, counterfeiting, conformity, and non-conformity assessments.

Additional aspects and advantages of this disclosure will be apparent from the following detailed description of preferred embodiments, which proceeds with reference to the accompanying drawings.

BRIEF DESCRIPTION OF THE DRAWINGS

In order to describe the manner in which the above-recited and other advantages and features of the present disclosure can be obtained, a more particular description follows by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 7A shows detail of two fingerprint feature locations on the numeral 3.

FIG. 7B shows detail of the damaged bill with the corresponding fingerprint feature locations called out for comparison.

DETAILED DESCRIPTION OF PREFERRED EMBODIMENTS

Figure 1:
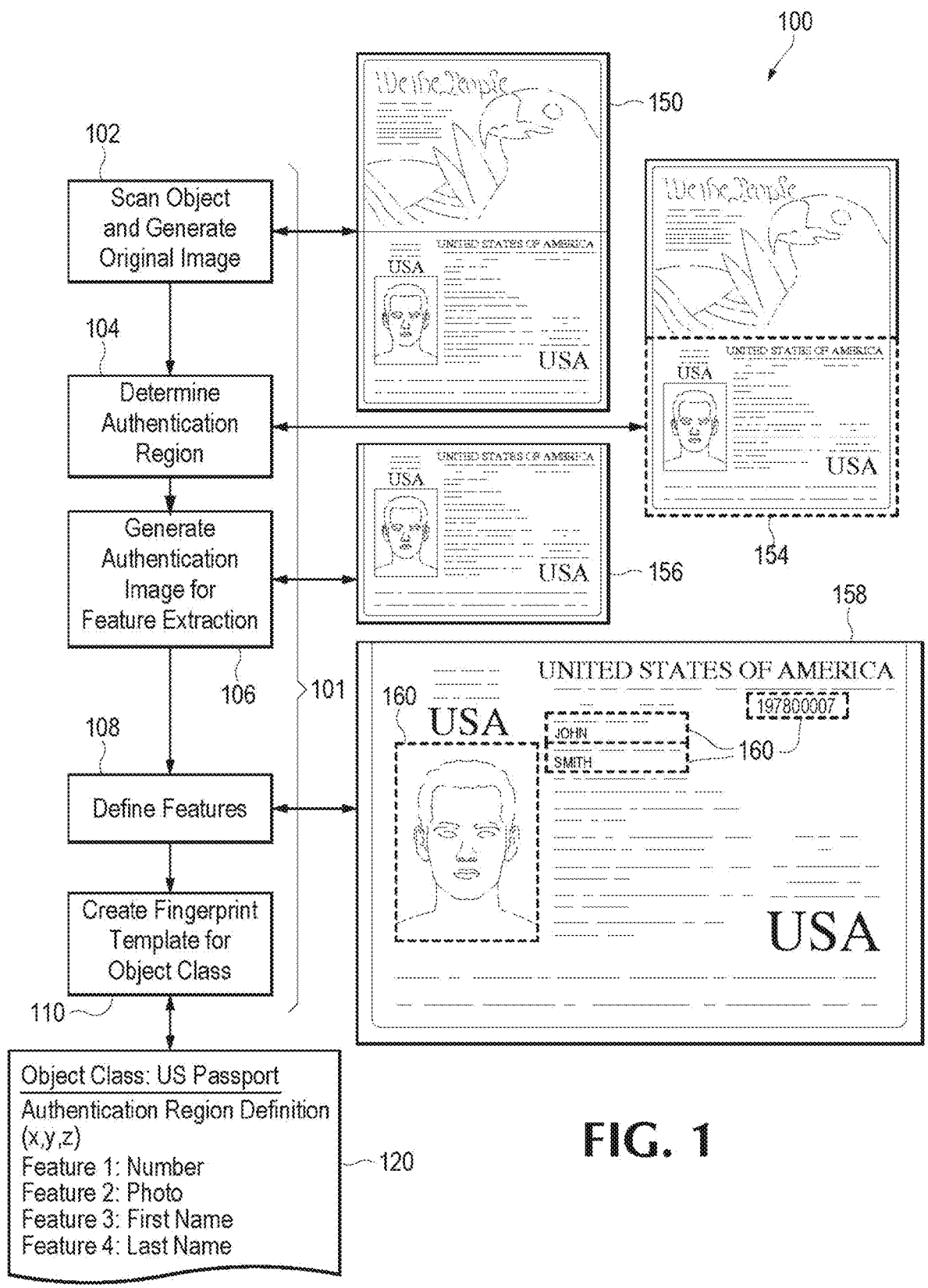
FIG. 1 is an example of an authentication region and fingerprint template definition for a U.S. passport.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purposes of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The methods described in the present disclosure enable the identification of an object without the need for attaching, applying, or associating physical tags or other extrinsic identifying materials with the object. A system does this by creating a unique digital signature for the object, which is referred to as a digital fingerprint. Digital fingerprinting utilizes the structure of the object, including random and/or deliberate features created, for example, during manufacturing or use of the object, to generate a unique digital signature for that object—similar to the way in which a human fingerprint references the friction ridges on a finger. Also, like a human fingerprint, the digital fingerprint can be stored and retrieved to identify objects at a later time.

Eliminating the need to add extrinsic identifiers or any physical modifications to an object offers a number of advantages to manufacturers, distributors, buyers, sellers, users, and owners of goods. Forgoing the addition of extrinsic identifiers reduces the cost of manufacturing and offers greater security than physical tagging. Moreover, physical identifiers can be damaged, lost, modified, stolen, duplicated, or counterfeited whereas digital fingerprints cannot.

Unlike prior art approaches that simply utilize a comparison of pixels, a system in accordance with the present disclosure utilizes the extraction of features to identify and authenticate objects. Feature extraction enables users to take a large amount of information and reduce it to a smaller set of data points that can be processed more efficiently. For example, a large digital image that contains tens of thousands of pixels may be reduced to a few locations of interest that can be used to identify an object. This reduced set of data is called a digital fingerprint. The digital fingerprint contains a set of fingerprint features or locations of interest which are typically stored as feature vectors. Feature vectors make image processing more efficient and reduce storage requirements as the entire image need not be stored in the database, only the feature vectors need to be stored. Examples of feature extraction algorithms include—but are not limited to—edge detection, corner detection, blob detection, wavelet features, Gabor, gradient and steerable output filter histograms, scale-invariant feature transformation, active contours, shape contexts, and parameterized shapes.

While the most common applications of the system may be in the authentication of physical objects such as manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals, and food and beverages. Here the term "system" is used in a broad sense, including the methods of the present disclosure as well as apparatus arranged to implement such methods.

Scanning

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure. Similarly, terms such as "scanner" and "scanning equipment" herein may be used in a broad sense to refer to any equipment capable of carrying out "scans" as defined above, or to equipment that carries out "scans" as defined above as part of their function.

Authenticating

In this application, different forms of the words "authenticate" and "authentication" will be used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference the action described as "authentication" or "attempted authentication" may also, post facto, also be properly described as an "induction". An authentication of an object may refer to the induction or authentication of an entire object or of a portion of an object.

Authentication Regions

Because digital fingerprinting works with many different types of objects, it may be useful to define what regions of digital images of objects are to be used for the extraction of features for authentication purposes. The chosen regions may vary for different classes of objects. In some embodiments, a chosen region may be the image of the entire object; in other embodiments chosen regions may be one or more sub-regions of the image of the object.

For instance, in the case of a photograph, a digital image of the entire photograph may be chosen for feature extraction. Each photograph is different and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template may be used (see FIG. 1) to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication. In other embodiments, however, all regions of an object may need to be authenticated to ensure an object is both authentic and has not been altered.

In one embodiment, a passport may provide an example of feature extractions from multiple authentication regions; see FIG. 1. In the case of a passport, features chosen for authentication may be extracted from regions containing specific identification information such as the passport number, the recipient name, the recipient photo, etc., as illustrated in FIG. 1. In some examples, a user may define a feature template specifying the regions whose alteration from the original would invalidate the passport, such as the photo, identifying personal data, or other regions considered important by the user. More details of feature templates are given in Ross, et at. U.S. Pat. No. 9,443,298.

FIG. 1 illustrates one example of an authentication region and a fingerprint template definition for a U.S. passport. In this figure, brace 101 refers to a simplified flow diagram of a process as follows: At process block 102, an object is scanned to generate an "original image", that is, a digital image file or a digital data file in any suitable format that is herein simply referred to as an "image". The original image is illustrated as the data page spread of a U.S. passport book, at block 150.

Next, the system processes the image data to determine an authentication region. In this example, the authentication region is the biographic data page of the U.S. Passport, located in the lower portion of image 150, identified by dashed box 154. Next, the process generates an authentication image for feature extraction, block 106. The authentication image is illustrated at reference 156. Next, at block 108, the process defines one or more locations of interest for feature vector extraction. The locations of interest in this example are, as shown in image 158 by dashed boxes 160, the surname, the given name, the passport number, and the passport photo.

Finally, at block 110, the process 100 comprises creating a fingerprint template 120. In this example, template 120 identifies an object class (U.S. Passport), defines an authentication region (for example, by X-Y coordinates), and lists one or more locations of interest within that authentication region. In this instance, the list comprises passport number, photo, first name, and last name.

In some embodiments, an ability to define and store optimal authentication regions for classes of objects may offer benefits to a user. In some embodiments, it may be preferable to scan limited regions of objects rather than to scan entire objects. For instance, in the case of an article of designer clothing, scanning a clothing label may be preferable to scanning an entire garment. (To be clear, the label or a portion of it is scanned for fingerprinting, not to recognize text on the label.) Further, defining such regions may enable detection of partial alteration of an object.

Once an authentication region is defined, specific applications may be created for different markets or classes of objects that may assist users in locating and scanning an optimal authentication region. In some embodiments, for example when utilizing a mobile device, a location box and crosshairs may automatically appear in the viewfinder of a smartphone camera application, to help the user center the camera on an authentication region, and automatically lock onto a region and complete a scan when the device is focused on an appropriate area. It should be noted that, although some examples suggested above are two-dimensional objects (passport, bank note), the present disclosure is fully applicable to three-dimensional objects as well. As previously noted, scanning may be of any kind, including 2-D, 3-D, stereoscopic, HD, etc. and is not limited to the use of visible light or to the use of light at all (as previously noted, sonar and ultrasound are, for example, appropriate scanning technologies).

In some embodiments, objects may have permanent labels or other identifying information attached to them. In addition to the objects themselves, these attachments may also be referenced as features for digital fingerprinting, particularly where the label or other identifying information becomes a permanent part of the object. In one example, a permanent label may be used as an authentication region for the object to which it is affixed. In another example, a label may be used in conjunction with the object itself to create a fingerprint of multiple authentication regions referencing both a label and an object to which the label is affixed.

In one example, wine may be put into a glass bottle and a label affixed to the bottle. Since it is possible that a label may be removed and re-applied elsewhere merely using the label itself as an authentication region may not be sufficient. In this case, the authentication region may be defined so as to include both a label and a substrate it is attached to—in this example some portion of a label and some portion of a glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some embodiments, multiple authentication regions may be chosen from which to extract unique features. In a preferred embodiment, multiple authentication regions may be selected to enable the separate authentication of one or more components or portions of an object. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the parts have changed. In other words, it may be helpful to determine that the distance (or other characteristics) between Part A's authentication region and Part B's authentication region remains consistent with the original feature extraction. If the positions of Parts A and B are found to be consistent to the relative locations of the original authentication regions, the firearm may be authenticated. Specifications of this type may be stored with or as part of a digital fingerprint of an object.

Fingerprint Template Definition

In an embodiment, when a new type or class of object is being scanned into a system for the first time, the system can create a fingerprint template (as shown in FIG. 1) that can be used to control subsequent authentication operations for that class of objects. This template may be created either automatically by the system or by a human-assisted process.

A fingerprint template is not required for the system to authenticate an object, as the system can automatically extract features and create a digital fingerprint of an object without it. However, the presence of a template may optimize the authentication process and add additional functionality to the system.

TABLE 1

Example Fingerprint Template.

CLASS:
[Description of the object]
United States Passport
AUTHENTICATION REGION:
[Description of the authentication regions for the object]
Region 1: (x1, y1, z1), (x2, y2, z2)
.
.
.
Region n
REGION MATCH LIST
[List of the regions that are required to match to identify an object]
Region List: 1 . . . n
FEATURES:
[Key features of the object]
Feature 1: Passport Number
Feature 2: Photo
Feature 3: First Name
Feature 4: Last Name
.
.
.
Feature n
METHODS:
[Programs that can be run on features of an object]
Feature 2:
Photo Method 1: [checkphoto.exe] Check for uneven edges indicating TABLE 1-continued Example Fingerprint Template.

photo substitution
.
.
.
Method n
Feature n
Method n
ADDITIONAL DATA
[Additional data associated with the object]
Data 1: example data
.
.
.
Data n The uses of the fingerprint template include but are not limited to determining the regions of interest on an object, the methods of extracting fingerprinting and other information from those regions of interest, and methods for comparing such features at different points in time. The name "fingerprint template" is not important; other data with similar functionality (but a different name) should be considered equivalent.

In an embodiment, four different but related uses for this technology are particularly in view in the present disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) assessing the degree to which an object conforms with a predetermined specification, such as a manufacturing specification or other applicable specification.

The uses of the fingerprint template include but are not limited to determining the regions of interest on an object, the methods of extracting fingerprinting and other information from those regions of interest, and methods for comparing such features at different points in time. The name "fingerprint template" is not important; other data with similar functionality (but a different name) should be considered equivalent.

In an embodiment, four different but related uses for this technology are particularly in view in the present disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) assessing the degree to which an object conforms with a predetermined specification, such as a manufacturing specification.

In example (1), an object is fingerprinted preferably during the creation process (or at any time when its provenance may be sufficiently ascertained) or at a point where an expert has determined its authenticity. Subsequently, the object is later re-fingerprinted, and the two sets of fingerprints are compared to establish authenticity of the object. The fingerprints may be generated by extracting a single fingerprint from the entire object or by extracting multiple sets of features from multiple authentication regions. Fingerprinting may also involve reading or otherwise detecting a name, number, or other identifying characteristics of the object using optical character recognition or other means which may be used to expedite or facilitate a comparison with other fingerprints. For instance, in cases where manufacturing (or other object) databases use serial numbers or other readable identifiers, such identifiers may be utilized to directly access the database record for the object and compare its digital fingerprint to the original that was previously stored, rather than searching an entire digital fingerprinting database for a match.

In case (2), a fingerprinted object is compared, region by region, with a digital fingerprint of an original object to detect low or nonexistent matching of the fingerprint features from those regions. While case (1) is designed to determine whether the original object is now present, case (2) is designed to detect whether the original object has been altered and, if so, how it has been altered. In some embodiments, authentication regions having poor or no matching fingerprint features will be presumed to have been altered.

In case (3), an object may not have been fingerprinted while its provenance was sufficiently ascertainable. One example would be bills or passports created prior to initiating the use of a digital fingerprinting system. In such examples, digital fingerprints of certain regions of interest on an object may be compared with digital fingerprints from known, or suspected, counterfeit objects or with both those and fingerprints of properly authenticated objects. In one example, a photograph may be spuriously added to a passport and, as an artifact of the counterfeiting, the edge of the added photo may tend to be sharper than an edge of an original, unaltered, photograph. In such a case, fingerprint characteristics of known authentic passports and those of passports that are known (or suspected to) have been altered by changing a photograph may be compared with the passport being inspected to estimate whether the passport exhibits indications of alteration.

Digital Fingerprint Generation

In an embodiment, once an object has been scanned and at least one authentication region has been identified, the digital image, which will be used to create the unique digital fingerprint for the object, is generated. The digital image (or set of images) provides the source information for the feature extraction process.

In the present disclosure, a digital fingerprinting feature is defined as a feature or a location of interest in an object, which feature is inherent to the object itself. In some embodiments, features preferably are a result of a manufacturing process, other external processes, or of any random, pseudo-random, or deliberate process or force, such as use. To give one example, gemstones have a crystal pattern which provides an identifying feature set. Every gemstone is unique and every gem stone has a series of random flaws in its crystal structure. This pattern of random flaws may be used for the extraction of feature vectors for identification and authentication.

In the present disclosure, a "feature" is not necessarily concerned with reading or recognizing meaningful content, for example by using methods like optical character recognition. A digital fingerprint of an object may capture both features of the object and features of any identifiers that are affixed or attached to the object. Feature vectors extracted from authentication regions located on an affixed identifier are based on the substances of which the identifier is physically comprised rather than the information (preferably alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the generation and use of a feature vector than a set of randomly printed lines and numbers.

Although reading identifier information is not necessary for digital fingerprinting, in some embodiments, where a user desires to capture or store identifier information (such as a name, serial number, or a bar code) in an association with an object, the system may allow the user to capture such information and store it in the digital fingerprint. Identifier information may, for example, be read and stored by utilizing techniques such as optical character recognition, and may be used to facilitate digital fingerprint comparisons. In some cases, serial numbers may be used as the primary index into a database that may also contain digital fingerprints. There may be practical reasons for referencing serial numbers in relations to digital fingerprints. In one example, a user is seeking determine whether a bank note is a match with a particular original. In this case, the user may be able to expedite the comparison by referencing the bank note serial number as an index into the digital fingerprinting database rather than iterating through a large quantity of fingerprints. In these types of cases, the index recognition may speed up the comparison process but it is not essential to it.

Once a suitable digital fingerprint of an object is generated the digital fingerprint may be stored or registered in a database. For example, in some embodiments, the digital fingerprint may comprise one or more fingerprint features which are stored as feature vectors. The database should preferably be secure. In some embodiments, a unique identifier, such as a serial number, may also be assigned to an object to serve, for example, as a convenient index. However, assigning a unique identifier is not essential as a digital fingerprint may itself serve as a key for searching a database independent of any addition of a unique identifier. In other words, since a digital fingerprint of an object identifies the object by the unique features and characteristics of the object itself the digital fingerprint renders unnecessary the use of arbitrary identifiers such as serial numbers or other labels and tags, etc.

Figure 2:
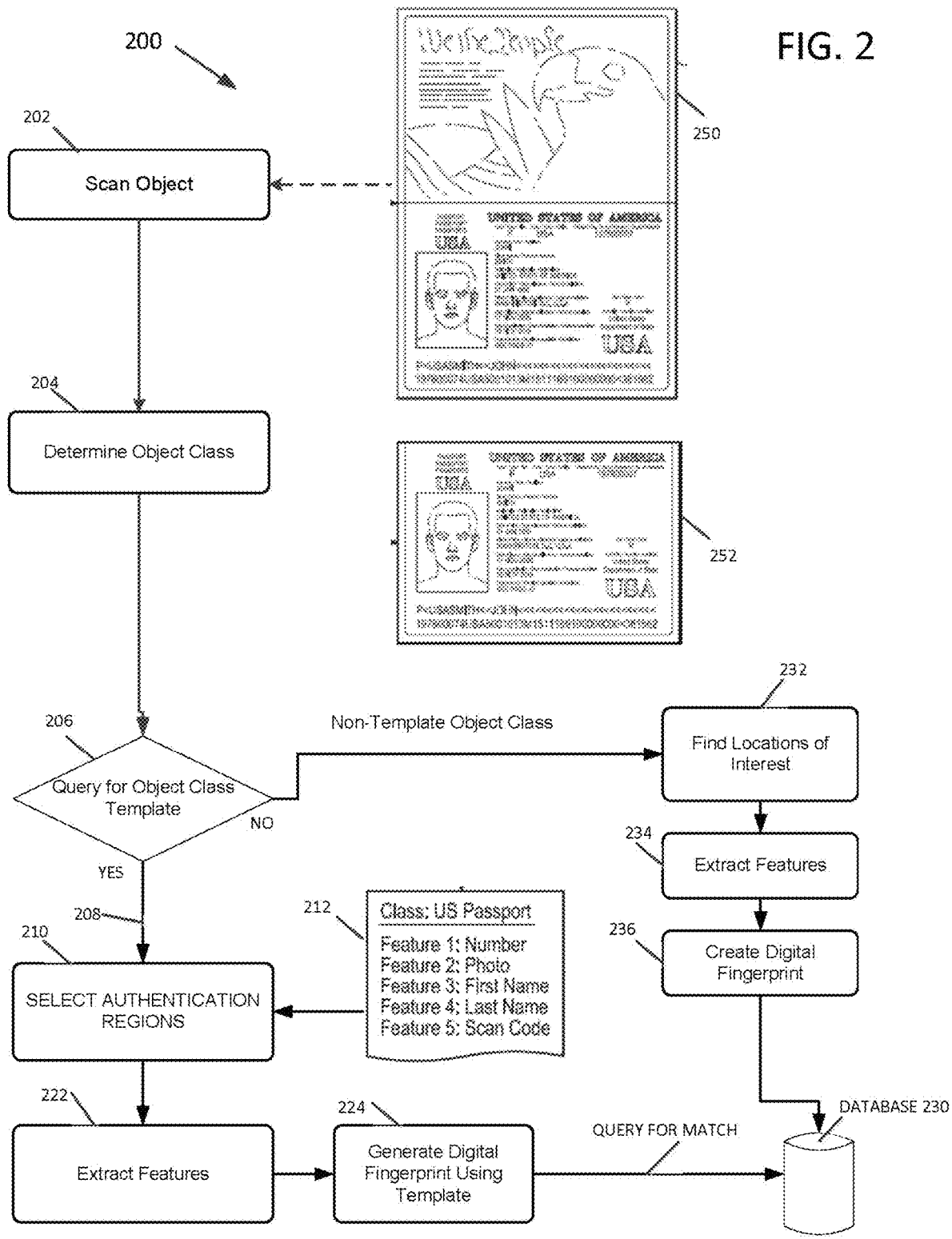
FIG. 2 is a simplified flow diagram of a process for authentication of a physical object based on digital fingerprinting.

FIG. 2 represents an example of a simplified flow diagram of a process 200 for authenticating or identifying an object using digital fingerprinting using a U.S. passport for illustration for part of the process. The process begins with scanning the object, block 202. An image 250 is acquired, in this illustration the front page of a U.S. passport is used. The next step is to determine a class of the object, block 204. This step may be omitted where the class is known. For example, at a border, a station may be in use that only checks U.S. passports. In another example, the system may be at a passport printing facility. Thus, the class of objects may be known a priori.

Next, at block 206, a database query may be conducted to see if a template exists in the system for the object that was scanned at 202. For example, in some cases, the initial image may be processed to extract a serial number or other identifying information. In an embodiment, the database may then be interrogated; decision 206, to see if a template exists for that serial number. If the answer is YES, path 208, the system accesses the template 212 and uses it to select one or more authentication regions 210. The template 212 lists the regions and their respective locations in the image (i.e. on the passport front page in this example). Physical locations may, as an example, be specified relative to a given location, and/or relative to each other. Location may be important because, for example, a replaced photograph may not be in exactly the same location as the removed original. In short, the template guides the authentication software in analyzing the image data. In that analysis, for each authentication region (called a "Feature" in 212), various features are extracted from the image data, block 222.

The extracted features are used to form a digital fingerprint of the object, block 224. For example, each feature may be described by a feature vector. Location and other data and metadata may be included in the fingerprint. In general, the process for extracting features and describing them in feature vectors may be specified in the template. The template may also specify which regions must be matched to declare the passport a match. In the passport example, all specified regions must match a record in the database for the passport to be determined to be authentic and unaltered. In other cases, a few matches may be sufficient. The digital fingerprint generated at block 224 is then used to query a reference database 230 for a match.

Returning to the decision block 206, there may not be an existing template in the system for the object under inspection—NO branch for "Non-Template Object Class." The process here may vary with the type of object under inspection and the purpose for the inspection. In some cases, a scanned image of an object may be processed to find locations of interest, block 232, for example, surface areas that are non-homogenous and thus have considerable image data content. In other words, finding locations of interest may be automated or semi-automated. The locations may be used to extract features, block 234 and/or recorded in a template for later use. Preferably, locations should be recorded in, or otherwise associated with, the digital fingerprint of the object.

In other examples, user input may be used to select authentication regions, and then the process proceeds to 234 as before. In some embodiments, an entire object may be scanned and all of the data processed to find and record digital fingerprint data. Whatever the case, the process proceeds to create a digital fingerprint, block 236, which can then be used to query the database 230 for a match. The match result may not be binary (yes/no); rather, in many cases, the result may indicate a confidence level of a match or may be a composite of binary results or confidence levels—such as when an object has been altered in part or in whole and/or has been assembled, or disassembled.

Example Authentication and Inspection Processes

In an embodiment, an object is scanned and an image is generated. The steps that follow depend on the operation to be performed. Several illustrative example cases are discussed below.

Case 1: For authentication of a previously fingerprinted object, the following steps may be followed (see FIG. 3, discussed below):

1. One or more authentication regions are determined, such as automatically by a system, or by utilizing the authentication region definitions stored in a fingerprint template.

2. Relevant features are extracted from each authentication region and a digital fingerprint is generated. Feature extractions preferably will be in the form of feature vectors, but other data structures may be used, as appropriate.

3. Optionally, other information, for example a unique identifier such as a serial number may be extracted and stored to augment subsequent search and identification functions.

4. The digital fingerprint of the object to be authenticated is compared to digital fingerprints stored in a database.

5. The system reports whether (or to what extent) the object matches one or more of the digital fingerprints stored in the database.

6. The system may store the digital fingerprint of the object to be authenticated in the database along with the results of the authentication process. Preferably, only the extracted features will be stored in the database, but the authentication image and/or the original image and/or other data and metadata may be stored in the database, for example for archival or audit purposes.

Figure 3:
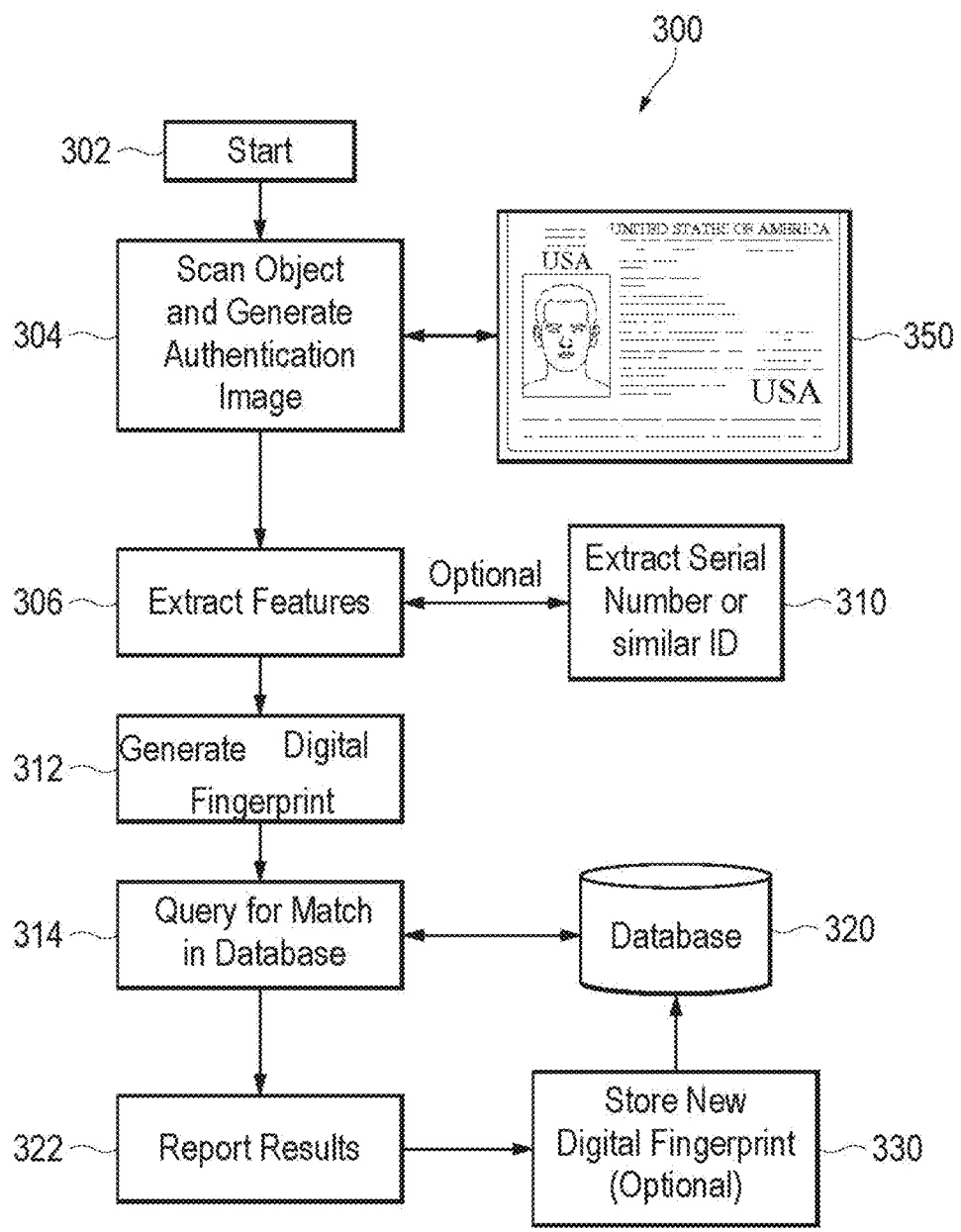
FIG. 3 is a simplified flow diagram of a process for authentication of a previously fingerprinted object.

FIG. 3 illustrates such a process 300 in diagrammatic form. Beginning at start block 302, the process scans an object and creates an authentication image, block 304. The image is represented at 350, using a passport as an example. Features are extracted, block 306, and optionally, other information, such as a serial number or similar ID number, preferably unique, may be extracted as well, block 310.

The extracted data is processed to generate a digital fingerprint, block 312. A database 320 may be queried for a matching fingerprint, block 314. A "match" may be defined by a binary, probability, or similarity metric or be a composite of metrics. Results of the database query may be reported to a user, block 322. Finally, a new digital fingerprint may be added to the database 320, shown at process block 330.

Case 2: For inspection of specific features of a previously fingerprinted object to determine whether they have been altered, the steps are similar to Case 1, but the process is aimed at detection of alterations rather than authentication of the object:

1. One or more authentication regions are determined, such as automatically by the system, or by utilizing the authentication region definitions stored in a fingerprint template.

2. The features to be inspected are extracted from an authentication region and the digital fingerprint is generated. The features extracted may be in the form of feature vectors for the features to be inspected but other data structures may be used, as appropriate.

3. Optionally, other information, for example a unique identifier such as a serial number may be extracted and stored to be used to augment subsequent search and identification functions.

4. The digital fingerprint of features to be inspected for alteration is compared to the fingerprint of the corresponding features from the original object stored in the database.

5. The system reports whether the object has been altered; i.e. the extent to which the digital fingerprint of the features to be inspected match those previously stored in the database from the original object, in whole or in part.

6. The system may store the digital fingerprint of the features to be inspected in the database along with the results of the inspection process. Preferably, only the features will be stored in the database, but the authentication image and/or the original image and/or other data and metadata may be stored in the database for archival or audit purposes.

Cases 3 and 4 are elaborated in related patent applications.

In all of the above cases, features may be extracted from images of objects scanned under variable conditions, such as different lighting conditions. Therefore, it is unlikely two different scans will produce completely identical digital fingerprints. In a preferred embodiment, the system is arranged to look up and match objects in the database when there is a "near miss." For example, two feature vectors [0, 1, 5, 5, 6, 8] and [0, 1, 6, 5, 6, 8] are not identical but by applying an appropriate difference metric the system can determine that they are close enough to say with a degree of certainty that they are from the same object that has been seen before. One example would be to calculate Euclidean distance between the two vectors in multi-dimensional space, and compare the result to a threshold value. This is similar to the analysis of human fingerprints. Each fingerprint taken is slightly different, but the identification of key features allows a statistical match with a high degree of certainty.

Figure 4A:
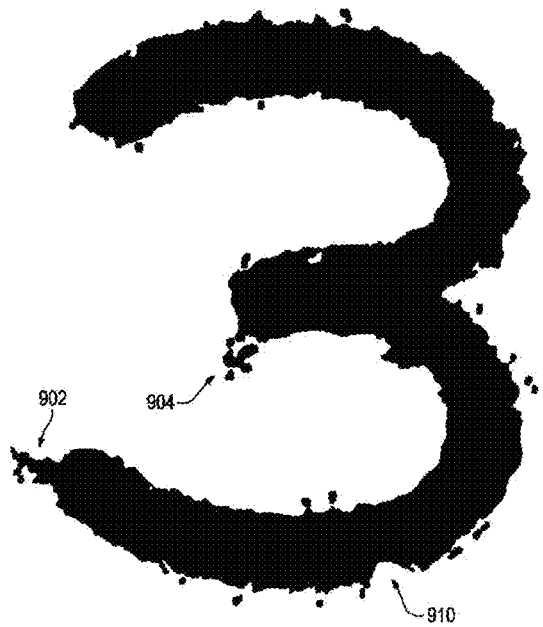
FIG. 4A shows an image of the numeral "3" representing the first digit in a serial number of an "original" or known U.S. dollar bill.

FIG. 4A illustrates an image of the numeral "3" representing a number printed on an "original" or known U.S. dollar bill. The bill may have been fingerprinted, for example, at the time of manufacture or public release, as described herein, or otherwise sufficiently authenticated for use as a reference. As noted below, fingerprint databases of currency and the like may be secured. Such databases preferably exclude raw image data. This image, on the order of about 40-fold magnification, shows a number of distinctive features visible to the naked eye.

Figure 4B:
FIG. 4B shows an image of the numeral "3" representing the first digit in a serial number of a U.S. dollar bill to be authenticated.

FIG. 4B illustrates an image of a number printed on a second or unknown U.S. dollar bill. The second bill may be fingerprinted using the same process, and then the resulting digital fingerprints, i.e., the respective fingerprint feature vectors, may be compared as further explained below, to determine whether or not the second bill is in fact the same one as the first bill. The comparison may take place even though the bill may have changed from wear and tear.

Figure 5A:
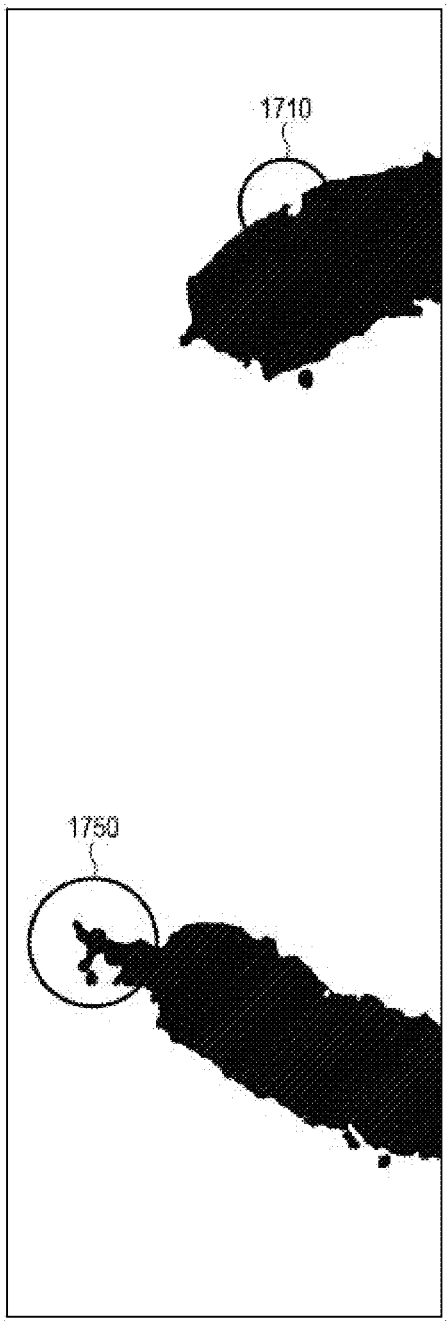
FIG. 5A is an illustration of results of feature extraction showing selected locations of interest in the image of FIG. 4A.

FIG. 5A is a simplified illustration of the results of feature extraction applied to the numeral 3 of FIG. 4A. In this figure, only the ends of the numeral are shown. Two locations of interest are called out by circles 1710 and 1750. The locations of interest need not necessarily be circular, but circular areas are advantageous for many applications. Below is a discussion on how these areas may be selected in an image. Fingerprint feature extraction is applied to each of the circular locations of interest. The results for each location may be stored as fingerprint feature vectors. To clarify, a "location of interest" (sometimes referred to as a "point" or "area" of interest), for example 1720, may well be a physical feature on the object, but the "feature vector" that characterizes that location of interest is not just a variation on the image around that location; rather, the feature vector is derived from it by any of a number of possible means. Preferably, a feature vector may be an array of numeric values. As such, feature vectors lend themselves to comparison and other analyses in a database system. A collection of feature vectors, say for location 1750, may be stored as a feature vector array.

Figure 5B:
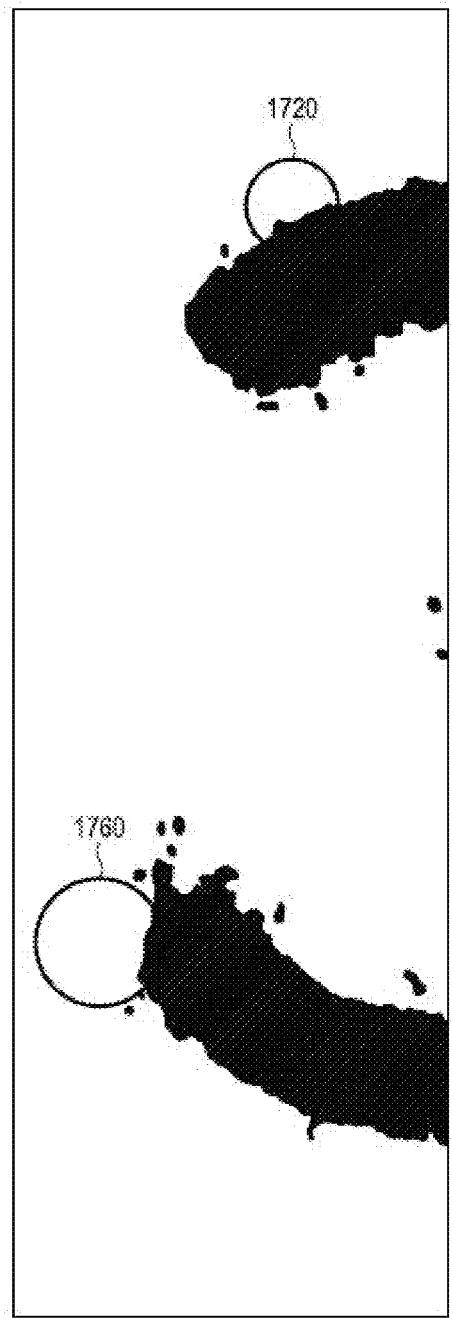
FIG. 5B is an illustration of results of feature extraction showing selected locations of interest in the image of FIG. 4B.

FIG. 5B is a simplified illustration of the results of feature extraction applied to locations of interest on the numeral 3 of FIG. 4B. The same fingerprinting process may be applied to this image. The same locations of interest as in FIG. 5A are labeled 1720 and 1760, respectively. The stored features (from the original object) are compared with the features extracted from the new object. As in this case, if the locations of interest are not encountered in the second object, or of the feature vectors characterizing those locations of interest are too different, there is no match (or a low confidence level for a match) for that location of interest. Variables, such as which locations must match and/or how many locations must match and/or the degree of matching required to conclude that an object matches the one previously fingerprinted, may in some embodiments be specified in a digital fingerprint record, further described below, or in some other associated record, to guide the decision process. This arrangement may be advantageous, for example, for exporting a database to a generic processor or system for remote authentication work. The matching logic may be embedded in the digital fingerprint record. Preferably, the matching logic is implemented in software as part of an authentication system.

Figure 6A:
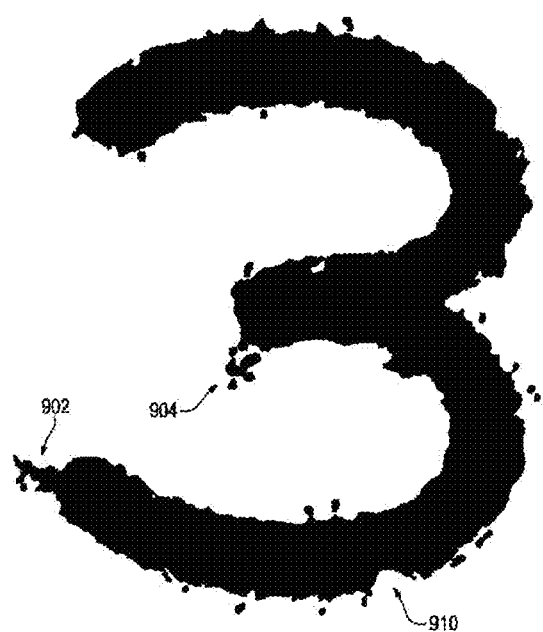
FIG. 6A shows the same dollar bill image as in FIG. 4A, juxtaposed with FIG. 6B for comparison.
Figure 6B:
FIG. 6B shows an image of the numeral "3" that has been damaged or degraded.

One advantage of the feature-based method is that when an object is worn from handling or use (even very worn), a system may still identify the object as original, which may be impossible with the bitmapped approach. FIG. 6A shows a numeral from the same dollar bill image as in FIG. 4A, juxtaposed with FIG. 6B for comparison. FIG. 6B shows the numeral on the same bill after the bill has been subjected to washing in a washing machine, perhaps as a result of being left in the pocket of a piece of clothing. In FIG. 15B, the image (or, rather, the dollar bill) has been degraded; there is significant loss of ink and destruction of the paper surface in multiple locations. A bitmapped approach to matching would likely fail to match these two figures due to the large number of pixels that are now different, as relatively few of the pixels remain the same as the original.

FIG. 7A shows the detail of two fingerprint feature locations as before, 1610 and 1650. FIG. 7B shows detail of the damaged bill with the corresponding locations called out as 1620 and 1660, respectively. A comparison between the similarities of area 1610 to area 1620 and of area 1650 to area 1660 illustrates how a comparison of the corresponding fingerprint feature vectors would be adequate to result in a match. In practice, a much larger number of features would be used.

The image of the damaged bill is analyzed by a processor. The processor accesses a database of previously stored fingerprint data. If the dollar bill serial number is legible (by eye or machine), the record for the corresponding bill may be accessed from the datastore using the serial number as an index. Similarly, if any portion of the serial number is legible, the search for a matching record can be narrowed on that basis. Either way, a candidate record, containing a set of stored regions of interest may be compared to the image of the damaged bill.

As explained above, in addition to being able to recognize a worn object, the feature-based approach is able to address other external problems such as rotated images. This is especially important in a system where an unsophisticated user, such as a retail customer, may be scanning an object to be authenticated. In such cases, external factors like lighting and rotation may not be under the system operator's control.

Figure 8:
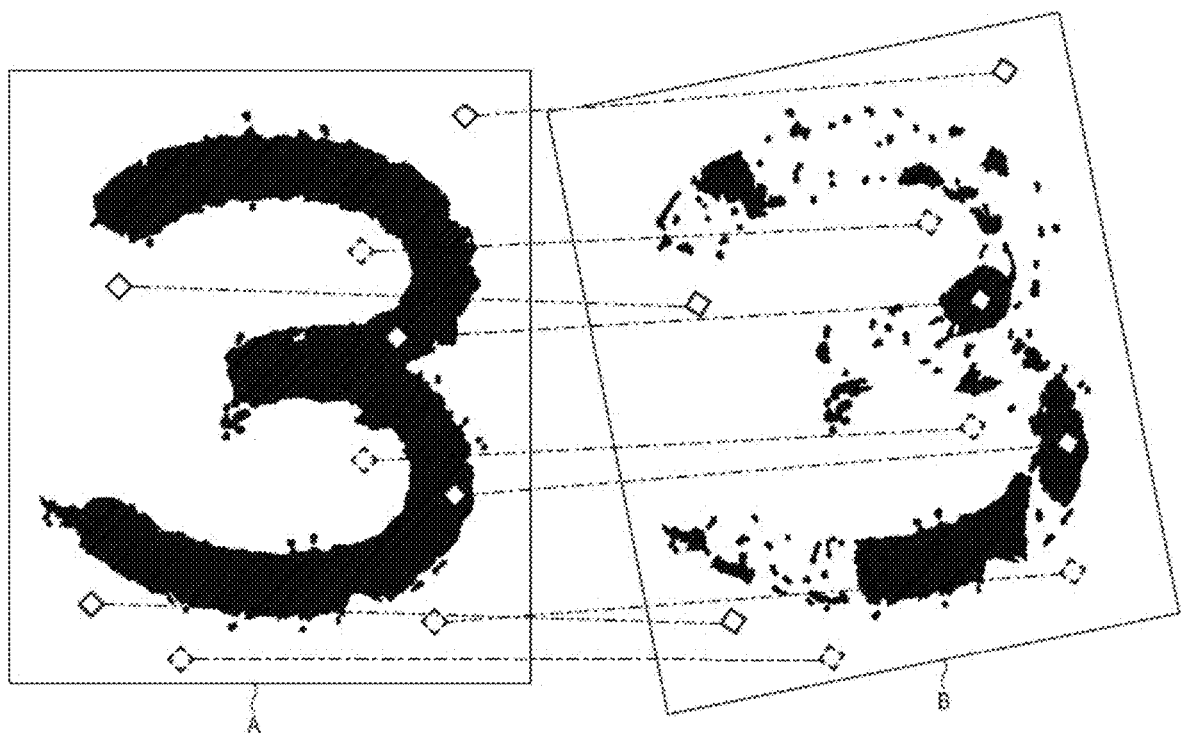
FIG. 8 is a simplified illustration of a rotational transformation in the process of comparing digital fingerprints of two images.

Referring now to FIG. 8, which shows the original image on the left side, with a small set of fingerprint features marked as small diamond shapes. This is merely a callout symbol for illustration. In some embodiments, as noted, preferably circular areas are used. For each feature (preferably identified in the database record), a search is conducted of the suspect image on the right side of FIG. 8 (or a portion of it) for a matching feature. The position may not match exactly, due to "stretch", an effective difference in magnification, and/or due to rotation of the image, or due to other circumstances. Although it may not match locations literally; a mathematical transformation may be defined that maps one image to the other, thereby accounting for rotation and stretch as appropriate. Thus, a bounding rectangle A indicated by the box in the left side image may be mapped to a quadrilateral, indicated by the line B in the right-side image.

Once an appropriate transformation is found, further matching may be done to increase the level of confidence of the match, if desired. In some embodiments, a number of matches on the order of tens or hundreds of match points may be considered sufficient. The number of non-match points also should be taken into account. That number should preferably be relatively low, but it may be non-zero due to random dirt, system "noise", and other circumstances. Preferably, the allowed mapping or transformation should be restricted depending on the type of object under inspection. For instance, some objects may be inflexible, which may restrict the possible deformations of the object.

Summarizing the imaging requirements for a typical fingerprinting system, for example for inspecting documents, the system preferably should provide sufficient imaging capability to show invariant features. Particulars will depend on the regions used for authentication. For many applications, 10-fold magnification may be adequate. For ink bleeds on passports, bills, and other high-value authentication, 40-fold magnification may likely be sufficient. In preferred embodiments, the software should implement a flexible response to accommodate misalignment (rotation), misorientation, and scale changes. Color imaging and analysis is generally not required for using the processes described above, but may be used in some cases.

Induction and Authentication

Figure 9:
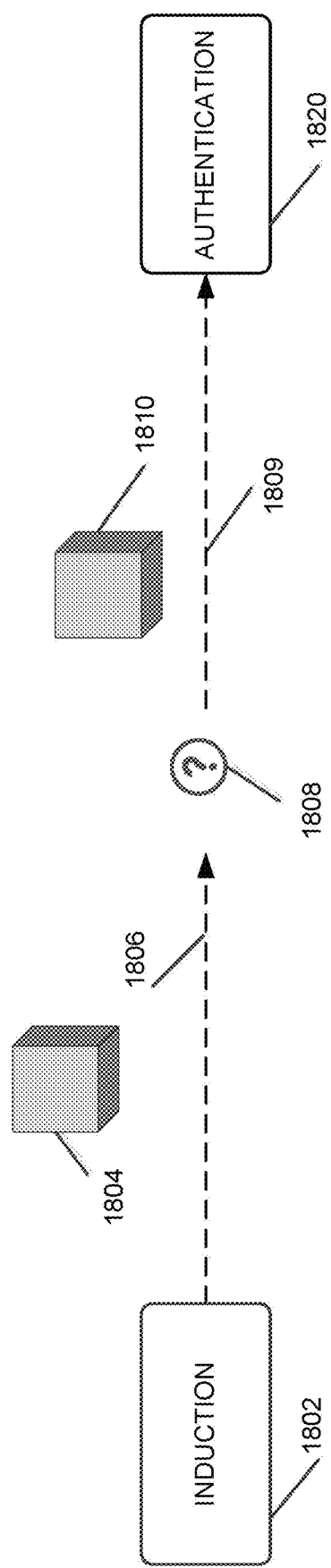
FIG. 9 is a simplified flow diagram of an induction-authentication process.

FIG. 9 is a simplified diagram illustrating the concepts of induction and authentication. The term "induction" is used in a general manner to refer to entering an object or a set of objects into an electronic system for subsequently identifying, tracking, or authenticating the object, or for other operations. The object itself is not entered into the system in a physical sense; rather, induction refers to creating and entering information into a memory or datastore from which it can later be searched, interrogated, retrieved, or utilized in other kinds of database operations.

In FIG. 9, induction 1802 thus may refer to a process that includes capturing an image of an object (or part of an object), processing the image to extract descriptive data, storing the extracted data, or any or all of these operations. The inducted object, represented by a cube 1804, then leaves the induction site, and proceeds in time and space along a path 1806. Induction may be done at the point of creation or manufacture of the object, or at any subsequent point in time. In some cases, induction may be done clandestinely, such as without the knowledge of the person or entity currently having ownership and/or possession of an object. The term "possession" is used in the broadest sense to include, for example, actual physical possession, as well as control—for example, having they key to a secure physical storage where an object is kept.

After induction, the object 1804 may encounter wear and tear, and otherwise may change, intentionally or not, in ways that may not be known a priori, represented by the question mark 1808. The original object 1804 may even in fact be lost or stolen after induction and a counterfeit may be introduced. Along path 1809, an object 1810 may be presented for authentication, represented by block 1820. Below are described some additional scenarios and use cases for the authentication technology described herein, and what may be done under the broad heading of "authentication". Under many circumstances, induction, authentication, or both may be done remotely by use of technology such as drones or by other covert means. In one example, an agent may take a photograph of an object with a smartphone, without the knowledge or consent of the possessor of the object, and the resulting image may be utilized for induction and/or authentication as described herein.

More specifically, in some embodiments, some part of the induction/authentication process may be done remote from a facility intended for that purpose. In addition, some part of the induction/authentication process may be accomplished without the knowledge of the then-current possessor of an object. In particular, the induction and/or authentication are not part of the current possessors' normal processes. These two criteria are not essential for the present disclosure, but are generally representative of some applications.

Figure 10:
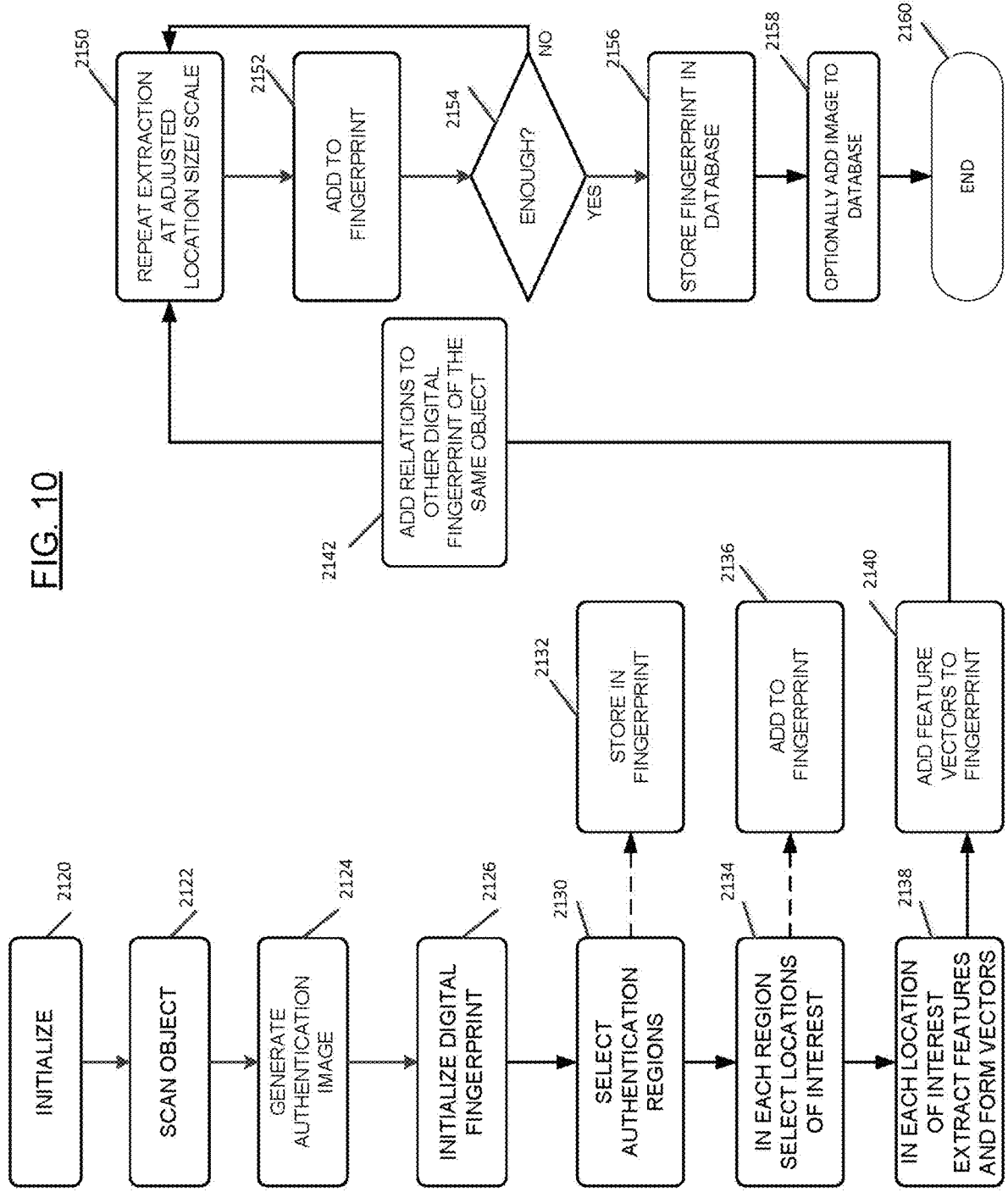
FIG. 10 is a simplified flow diagram of an in-field induction process to enable tracing an object.

FIG. 10 is a simplified flow diagram of one example of a process for creating a digital fingerprint that includes feature vectors based on a scanned image of an object. The process begins with initialization at block 2120. This step may comprise initializing a datastore, calibrating an image capture system, or other preliminary operations. An object or object is scanned, block 2122, forming digital image data. Preferably, depending on the context, the scanning may be automated. In other cases, an operator may be involved in manual scanning. From the image data, an authentication image is generated, block 2124, which may comprise all or a selected subset of the scan data. Next, a digital fingerprint record may be initialized, for example in a memory or datastore, block 2126.

To begin forming a digital fingerprint of a scanned object, at least one authentication region is selected, block 2130, in the authentication image data. This selection preferably is carried out by the fingerprinting software. The authentication region(s) may be selected according to a predetermined template based on the class of objects. Locations of the authentication regions may be stored in the digital fingerprint record, block 2132.

At block 2134, the process continues by selecting locations of interest within each authentication region. To select locations of interest (areas in an image from which to extract fingerprint features), a software process may automatically select a large number—typically hundreds or even thousands per square mm—of preferred locations of interest for purposes of the digital fingerprint. A location may be of interest because of a relatively high level of content. That "content" in a preferred embodiment may comprise a gradient or vector, including a change in value and a direction. The selected locations of interest may be added to the fingerprint record, block 2136. In one example, such areas may be identified by a location or centroid, and a radius thus defining a circular region. Circular regions are preferred for some applications because they are not affected by rotation of the image.

Next, block 2138, the process calls for extracting features from each location of interest, and forming feature vectors to describe those features in a compact form that facilitates later analysis, for example, calculation of vector distances as a metric of similarity in comparing fingerprints for authentication. Various techniques are known for extracting such features. The resulting feature vectors are added to the fingerprint, block 2140. At block 2142, additional information may be added to the digital fingerprint identifying other fingerprints and related information associated with the same object. In some embodiments, a relationship, such as relative location of the other fingerprints to the current fingerprint may be used. For example, in some objects, multiple regions may be authentic individually, but a change in their relative location may indicate that the object is not authentic. Thus, a fingerprint record may include first and second feature vectors (each describing a corresponding feature extracted from an area of interest) and a relative location of one to the other.

Above, with regard to FIG. 8, the transformation from one set of feature vectors to another was described, to accommodate stretch, rotation or variations in magnification. In similar fashion, relative locations of features in a fingerprint can be stored in the record and used for comparison to a new fingerprint under consideration. The feature extraction may be repeated, block 2150, using an adjusted area size or scale (such as magnification). Feature vectors created at the adjusted size may be added to the fingerprint, block 2152. Additional features may be extracted at additional magnification values, until an adequate number are provided, decision 2154. This additional data may be added to the fingerprint, block 2156. This data may be helpful in finding a matching fingerprint where the authentication image magnification is not the same as the image at the time of induction of the object. Finally, and optionally, the scanned image itself (generated at 2122) may be added to the database, block 2158. This process to build a digital fingerprint ends at 2160.

Event-Driven Authentication

Authentication may be conducted in response to a trigger. That is, authentication performed outside the normal steady functioning of a system (in contrast, for example, to inducting parts as they are manufactured and authenticating them as they are installed). In view in this disclosure is any form of event trigger (see the progression below) and any form of authentication using fingerprinting or similar technology. Each of the following are non-limiting examples of events that could serve as triggers. Each of them could be utilized to trigger the kinds of authentication taught above in this document.

Schedule-based triggering. In one example, this disclosure envisions a system where authentication is triggered on a schedule (e.g. as part of quarterly inventory, or two hours past closing time). Triggering on a schedule is close to being "part of the normal . . . functioning of the system" but is included for completeness in the spectrum of "event-driven authentication". This form would include normal calendaring but also following computer scripts or even periodic, random, or from time-to-time manual interrupts of normal processes.

Figure 11:
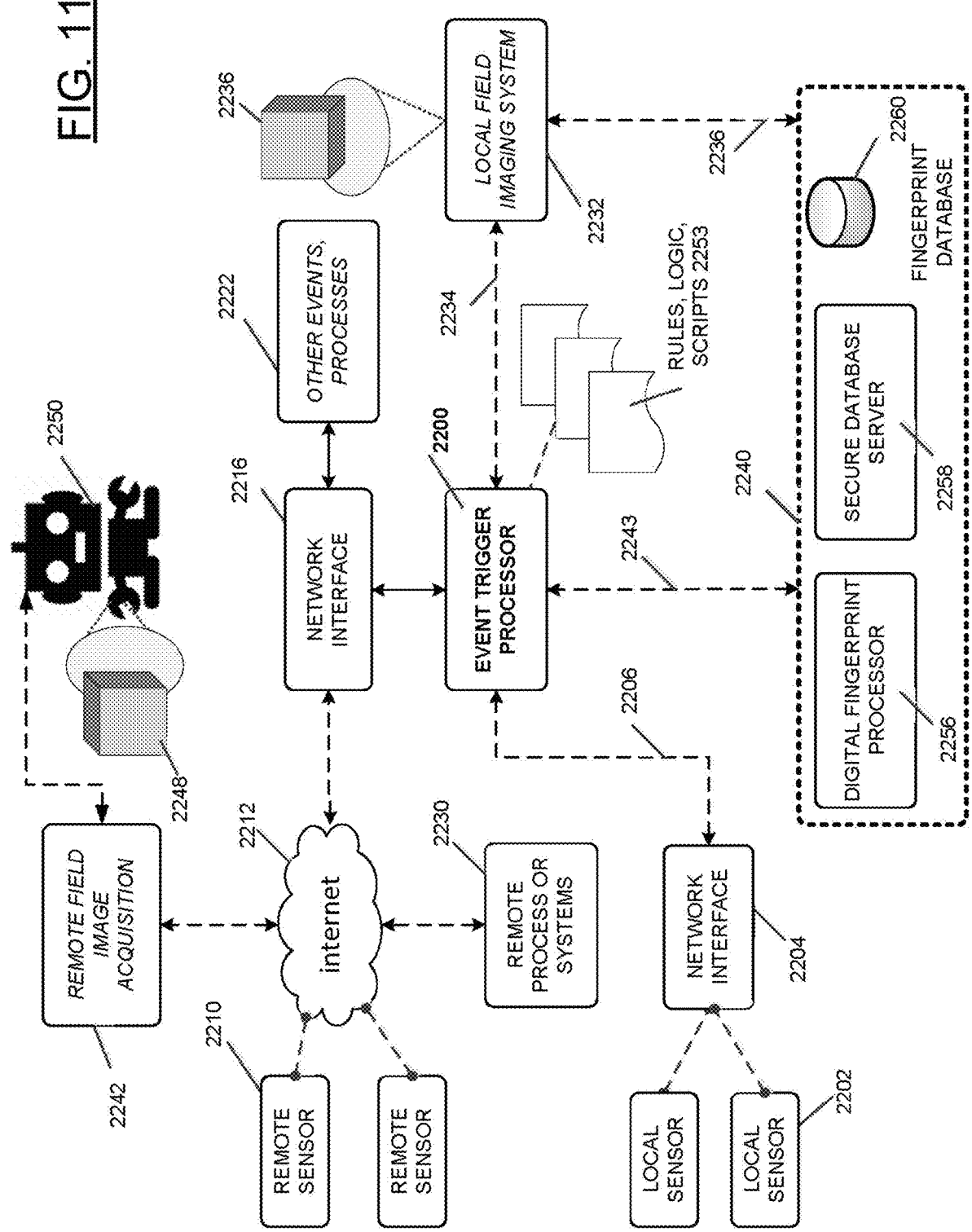
FIG. 11 is a simplified hybrid system/communication diagram illustrating several different arrangements and applications of the present disclosure.

Event triggering. FIG. 11 is a simplified hybrid system/communication diagram illustrating several different arrangements and applications of the present disclosure. A particular system may implement all of the features shown in FIG. 11, or more typically, only a subset of them. For example, an event-triggered system may be "local" in the sense of installation at one location, for example, at a parts manufacturer, or a shipping or warehouse facility. In a local installation, the remote sensors and internet connectivity may be unnecessary. In other applications, remote sensors, and remote authentication equipment may be used.

Referring to FIG. 11 in the center, an event trigger processor 2200 ("ETP"), which may comprise any type of programmable digital processor, is arranged for various communications. Details of network interfaces, user interfaces, memory, etc. which are familiar in the industry, are omitted for clarity. In some embodiments, one or more local sensors 2202 may be coupled to a network interface 2204 for communication with the event trigger processor 2200 via link 2206, which may be wired or wireless. Output signals from the sensor(s) may be utilized by the ETP 2200 as triggers to initiate authentication actions, local or remote, as further explained below.

The ETP may initiate various actions, responsive to a trigger input signal, for example, by sending a message to another entity or system, in particular an authentication system. Hence the title, "Event-Driven Authentication." The ETP may command the actions, for example, using known network communication protocols. In one example, responsive to the back door of a warehouse being detected as opening (a sensor input), the ETP may send a message to a remote system to have it conduct an inventory of the warehouse, in part or in whole. The remote system may utilize appropriate scanning equipment to capture images for the inventory for fingerprinting. The processes illustrated by FIG. 11 include the use of sensors of all types, such as RFID and thermal sensors, to smart dust connected to the internet or computerized networks to name but a few.

In some embodiments, one or more remote sensors 2210, i.e., sensors that are not at the same physical location as the ETP 2200, may be coupled over a network, such as a LAN, WAN, or the internet 2212, for connection to the ETP 2200 via a suitable network interface 2216. In operation, output signals from the remote sensor(s) may be utilized by the ETP 2200 as triggers to initiate authentication actions, which again may be local or remote.

In some embodiments, other remote processes or systems 2230 may be similarly coupled over a network to communicate with the ETP 2200. As one illustration: a piece of luggage is going down a conveyor (not shown) and is normally to be routed by reading the bag tag. It passes a bag tag reader, but this time the reader does not get a read. The bag tag reader may be a remote process or system 2230 coupled to the ETP 2200. In this case, a tag reader failure message triggers a process or response in the ETP 2200 that initiates a full fingerprint-based authentication of the (previously inducted) luggage item. The authentication process may be performed in various ways, several of which are described in detail above.

In some embodiments, the ETP 2200 may direct a local field imaging system 2232 via a link 2234. The ETP may be coupled directly to the local imaging system 2232 in some applications. In other cases, it may be communicatively coupled over a network. In an embodiment, the local system 2232 may acquire image data of an object 2236 (for example, the aforementioned luggage item). The imaging system 2232 may interact via link 2236 with a fingerprint processing and storage system 2240. In an embodiment, the fingerprint system 2240 may include a digital fingerprint processor 2256, a secure database server 2258, and a fingerprint database 2260 described in more detail above. The fingerprinting system 2240 may be local or remote, for example, in the cloud. It may be coupled via link 2243 to the ETP 2200.

In some embodiments, the triggered authentication process may be done remotely from the ETP 2200. for example, the ETP 2200 may communicate via interface 2216 and internet 2212 with a remote field image acquisition system 2242. This system is configured for image capture for authentication (and optionally other purposes). The image system 2242 may be part of a larger manufacturing, assembly, or other operation. The image system 2242 may be integrated into other machinery, or it may stand alone. The image system 2242 may be operable by a robot 2250 to capture an image of an object 2248 for authentication. The robot 2250 may be mobile, for example, to move about a warehouse capturing images for inventory control. The robot may capture images, for example, following a door ajar or break-in trigger (detected by a sensor as described). The image system 2242 may work in concert with a fingerprint system such as 2240, with which it may communicate over a network. In another example, authentication may be triggered by loading dock receipt of components missing an expected RFID tag or documentation.

Preferably, authentication may be triggered by sensors (as noted), or by rules or logic 2253, which may be realized in the form of computer code or scripts, or by the physical presence of an unexpected item, or the absence of an expected one. The trigger processor may take an action based on a combination of inputs, processed according to the applicable rules and logic.

This disclosure further includes authentication triggered by detection of another event—which event may or may not be directly related to the authentication process. Other events and processes 2222 may communicate with the ETP 2200 as illustrated or otherwise. One example is a conveyor that is carrying bags to their airplanes when a jam occurs. Currently this would mean that all those bags must, once the belt is restarted, be routed past a bag tag reader to reestablish each bag's identity. With a proposed embodiment, the system would immediately authenticate and locate each bag on the affected conveyor(s) so that when the jam is cleared, each bag can continue on its way without the need to reroute past a bag tag reader. Thus, in such a scenario, an image system 2232 or 2242 may be configured to capture images of luggage items, responsive to direction from the ETP 2200, which reacts to a jam sensor signal (from, for example, local sensors 2202) from a luggage conveyor (not shown).

In another embodiment, a particular machined part may be both expensive and critical to system functioning and its arrival at an aircraft manufacturer may trigger a full authentication process (e.g. reading the serial number and manufacturer, fingerprinting the item, comparing the fingerprints with those in the reference database, and confirming/denying the authenticity of the item.)

Security cameras have in recent years become commonplace and widespread in both the public and private sector. Some security cameras are monitored by security personnel but others (such as at baggage or parcel handling facilities, along with most in-store security cameras) are intended for post facto forensics. The present disclosure teaches the triggering of authentication by real-time forensics, generally taken to mean using some form of predictive analytics or artificial intelligence to determine that an unusual event has taken place and what the correct response to that event is. Systems and methods such as those illustrated above may be used to provide these features.

As a further illustration, an AI program detects a person moving near a baggage conveyor in the airport where no persons are supposed to be present. In some embodiments, a camera may be the input for local sensor 2202 that provides image data (still or motion) as its "output signals." An AI program may be part of the ETP 2200 for analyzing the image data. In response to this recognition "trigger," the ETP 2200 may enhance or escalate the level of tracking on the bags in the airport luggage handling system, such as looking to find bags that have been added or are now missing from the system or that are now out of place. For example, the system may then acquire fingerprints of bags at a given location—say in the vicinity of the detected unauthorized person—using a system 2232, and query the fingerprint system 2240 database (via link 2242) to confirm that no bags have been added or removed. This feature may be applied for parcels at a sortation house, manufactured items on a conveyor, and many other cases. The proposed system may also include predictive or AI modeling to monitor external data (e.g. on the web) such as related news and sentiment to weight the frequency of authentication as well as communicate awareness/status on any item or group of items related to the area of abnormal concern.

Figure 12:
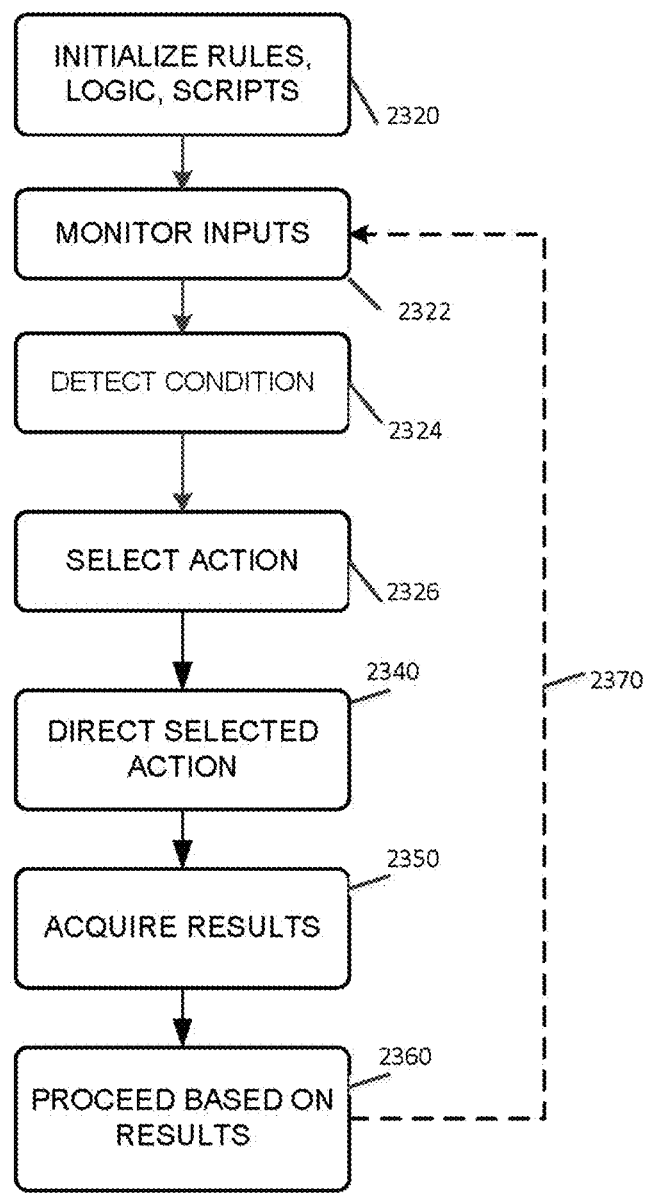
FIG. 12 is a simplified flow diagram of one example of a process in accordance with the present disclosure for event-triggered authentication.

FIG. 12 is a simplified flow diagram of one example 2300 of a process in accordance with the present disclosure for event-triggered authentication. In the diagram 2300, a process begins with initializing or loading one or more rules, logic or scripts, block 2320. In some embodiments, these elements may be implemented in software. In some embodiments, such software may be executed in a server, such as the ETP 2200. In operation, the software monitors various inputs, block 2322, communicated from one or more external processes, sensors, etc. as described with regard to FIG. 11. Inputs (for example, sensor output signals) may be monitored by polling, interrupts, scheduled messaging, etc. When a particular input or condition is detected, block 2324, the process next selects a responsive action, 2326, based on the applicable rules, logic or scripts. Next the process directs or initiates the selected action, 2340, such as acquiring and processing authentication data as mentioned above. Next, the process may acquire results of the authentication-related actions, block 2350, in some cases, and then take further action based on the results, block 2360, if indicated by the based on the applicable rules, logic or scripts. Next the process may loop via path 2370 to continue monitoring block 2322. The steps here described are merely illustrative and some of them may be executed in parallel rather than seriatim. Some types of sensor inputs may trigger immediate actions, while others may be cumulative or otherwise have lower priority.

Hardware and Software

Most of the equipment discussed above comprises hardware and associated software. For example, the typical portable device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the invention.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A system, comprising:
    a digital fingerprinting system configured to generate digital fingerprints of each of a plurality of physical objects, each digital fingerprint based on digital image data of at least a portion of a corresponding physical object, and wherein each digital fingerprint is based solely on native features of the corresponding physical object and not based on any identifier, label, or other proxy added to the physical object for identification or authentication and the digital fingerprint contains a set of fingerprint features which are extracted from one or more authentication regions in the digital image data;
    a first sensor arranged to detect a trigger event or condition caused by an object that is physically separate from the plurality of physical objects, the first sensor arranged to transmit a trigger message based on detecting the trigger event or condition; and
    an event trigger processor connected to the first sensor and arranged to:
        receive trigger messages from one or more sensors including the first sensor;
        process each received trigger message;
        select an authentication action based on the processing of each respective trigger message, wherein the authentication action is performed on the plurality of physical objects; and
        cause transmission of a message to the digital fingerprinting system to direct the selected authentication action being performed on at least one of the plurality of physical objects.

2. The system of claim 1, wherein the event trigger processor is configured to select the authentication action based on at least one of a predetermined logical relationship, rule, or script.

3. The system of claim 1, wherein the authentication action selected by the event trigger processor comprises:
    operate an optical scanner to acquire digital image data representing an image of at least a portion of a certain physical object positioned within view of the optical scanner;
    process the acquired digital image data to form a digital fingerprint, the digital fingerprint containing a set of fingerprint features which are extracted from authentication regions and stored as feature vectors; and
    use the digital fingerprint to store or update an inventory including the plurality of physical objects.

4. The system of claim 1, wherein the authentication action selected by the event trigger processor comprises:
    operate an optical scanner to acquire digital image data representing an image of at least a portion of a certain physical object positioned within view of the optical scanner;
    process the acquired digital image data to form a digital fingerprint, the digital fingerprint containing a set of fingerprint features which are extracted from authentication regions of the image data and stored as feature vectors; and
    query a reference datastore based on the digital fingerprint to obtain a result.

5. The system of claim 4, wherein the event processor is further arranged to:
    obtain a second result from the digital fingerprinting system responsive to the directing of the selected authentication action; and
    execute a predetermined action by the event trigger processor based on the obtained second result.

6. The system of claim 5, wherein the second result indicates a match of the certain physical object was found in the reference datastore.

7. The system of claim 1, wherein the trigger event or condition includes the certain physical object not arriving at a particular location within a predetermined time window.

8. The system of claim 1, wherein the first sensor is arranged to transmit the trigger message responsive to a state change of an electro-mechanical switch.

9. The system of claim 1, wherein the trigger message is associated with a luggage item, and wherein the selected authentication action is to scan and fingerprint the luggage item to identify the luggage item.

10. The system of claim 1, wherein the trigger event or condition is indicated on a predetermined schedule.

11. The system of claim 1, wherein the first sensor is one or more of a light sensor, an RFID tag, a thermal sensor, and a door open sensor.

12. The system of claim 1, wherein the trigger event or condition is based on periodic, random, or from time-to-time manual interrupts of a selected process.

13. The system of claim 1, wherein the trigger message is transmitted over a network from a remote sensor.

14. The system of claim 1, wherein the trigger event or condition is responsive to a physical parameter measured by the first sensor.

15. The system of claim 4, wherein the first sensor is coupled to a machine and wherein the trigger event or condition includes the certain physical object being produced by or ejected from the machine.

16. The system of claim 1, wherein the first sensor is a sensor configured to detect presence of a person in a vicinity of the first sensor, and wherein the first sensor is arranged to transmit the trigger message to the event trigger processor responsive to detecting the presence of the person in the vicinity.

17. The system of claim 1, wherein the digital fingerprinting system includes an optical scanner, wherein the optical scanner includes a video capture device, wherein the event trigger processor executes software to detect objects that may enter and/or leave a field of view of the video capture device, and wherein the software is arranged to generate the trigger message that is transmitted to the event trigger processor responsive to detecting the certain physical object entering and/or leaving the field of view.

18. The system of claim 1, further comprising:
a mechanism arranged to physically adjust the digital fingerprinting system to enable acquisition of image data from multiple locations.

19. The system of claim 18, further comprising:
a control program to automatically operate the mechanism to physically adjust the fingerprinting system based on information in the trigger message.

20. The system of claim 1, wherein the object that causes the trigger event or condition is a certain physical object of the plurality of physical objects whose fingerprint is being generated by the digital fingerprinting system.

21. The system of claim 1, wherein the trigger event or condition includes a scheduled inventory of the plurality of physical objects or a function of a system that stores or handles the plurality of physical objects.

22. A method, comprising:
receiving a trigger input from a sensor, the sensor arranged to detect an event or condition caused by an object that is physically separate from a plurality of physical objects;
responsive to the trigger input, scanning at least a part of a certain physical object to acquire digital image data;
based on the digital image data, generating a digital fingerprint responsive to native features of the certain physical object and not based on any identifier, label, or other proxy added to the certain physical object for identification or authentication; wherein generating the digital fingerprint includes selecting at least one authentication region in the image data, extracting at least one fingerprint feature from the at least one authentication region, and storing the extracted at least one fingerprint feature in the digital fingerprint;
based on the digital fingerprint, querying a reference database for a match to authenticate the certain physical object, the reference database having a digital fingerprint for the plurality of physical objects;
selecting an authentication action based on a processing of the trigger input, wherein the authentication action is performed on at least one of the plurality of physical objects; and
performing the selected authentication action on the plurality of physical objects.

23. The method of claim 22, wherein the sensor is an event trigger processor connected to the sensor, and wherein the trigger input is generated programmatically by a computer script executed on the event trigger processor.

24. The method of claim 23, wherein the computer script generates the trigger input on a periodic, random, or manual interrupt basis.

25. The method of claim 22, wherein the sensor generates an output signal responsive to a physical parameter measured by the sensor that is independent of the certain physical object.

26. The method of claim 22, wherein the object that causes the trigger event or condition is a certain physical object of the plurality of physical objects whose fingerprint is being generated by the digital fingerprinting system.

\* \* \* \* \*